July 23, 1935.  E. PRICE  2,009,120

BRAKE

Filed July 3, 1934

Inventor:
Edgar Price,
by Harry E. Dunham
His Attorney.

Patented July 23, 1935

2,009,120

UNITED STATES PATENT OFFICE 2,009,120

BRAKE

Edgar Price, Schenectady, N. Y., assignor to General Electric Company, a corporation of New York Application July 3, 1934, Serial No. 733,567

5 Claims. (Cl. 188—171)

My invention relates to brakes of the form in which the brake is adapted to engage a drum and it relates particularly to brakes of that type wherein the brake is applied by resilient means and is released by electromagnetic means.

One object of my invention is to provide an improved brake of this type which is simple in construction, efficient in operation and inexpensive to manufacture. A further object of my invention is the provision of a brake of the shoe type which shall have a large arc of contact with the cooperating drum.

My invention will be better understood from the following description taken in connection with the accompanying drawing, and its scope will be pointed out in the appended claims.

Figure 1:
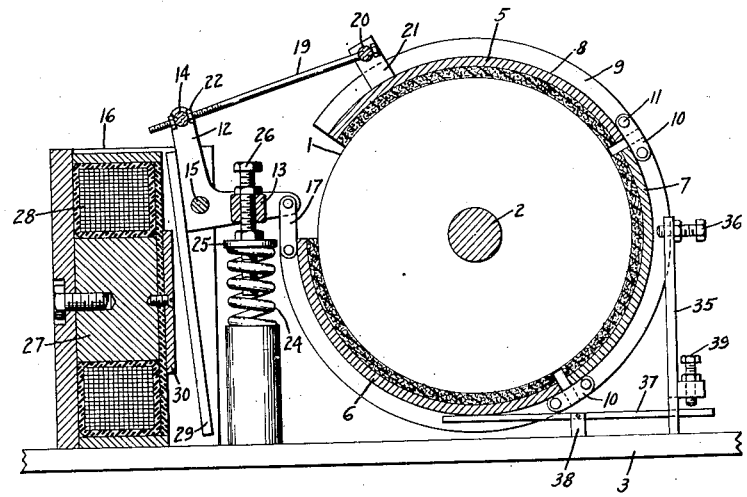
Figure 2:
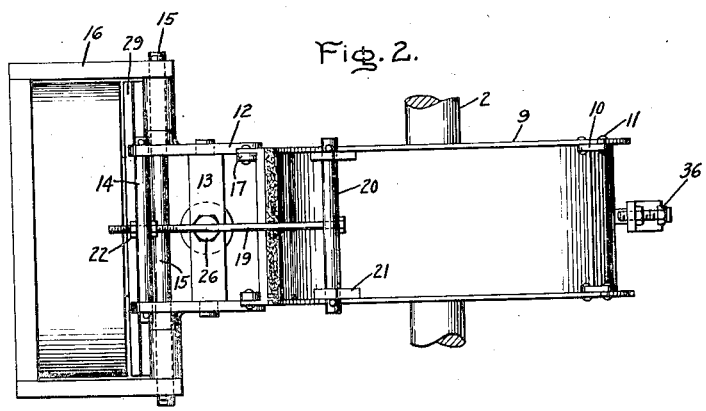

Referring to the drawing, Fig. 1 is a vertical sectional view of a brake involving my invention, and Fig. 2 is a top view of the same.

In the drawing the brake drum 1 is mounted on the shaft 2 which by means not shown is rotatably mounted on the base plate 3. Cooperating with the face of the drum 1 is the brake proper which comprises a plurality of rigid shoes, three in number in the form illustrated, comprising the upper shoe 5, the lower shoe 6, and the intermediate shoe 7. Each of these shoes comprises a body portion 8 having a suitable friction facing and having at each side a stiffening flange 9. At their adjacent ends the shoes are pivotally connected together. The pivotal connecting means which I prefer and which I have illustrated comprises pairs of links 10 secured by the pins 11 to the flanges of the adjacent shoes. The pin connection between the links of each pair and one shoe is such as to allow entire freedom of movement therebetween but the pin connection between the links of each pair and the other shoe offers sufficient friction to prevent relative movement except that necessary to allow the shoes properly to engage the drum when the brake is applied. It will be noted that the pivotal connections between adjacent ends of the shoes have no fixed support and thus are free to move in a radial and a circumferential direction with respect to the drum. As a result the shoes engage the drum with a substantially uniform pressure throughout their length and this uniformity of pressure between the shoes and the drum is not affected by wear of the brake shoe facing.

The brake operating lever 12 is shown as a bellcrank lever and as comprising two similar plates connected together by the transverse members 13 and 14 and the fulcrum rod 15 which is supported by the two stationary end plates 16. The horizontal arm of lever 12 connects with the lower shoe 6 through the link 17 which is pinned to the lever for free relative movement but pinned to shoe 6 to restrain relative movement except when the brake is applied. The upper arm of the lever connects through the transverse rod 14 and the adjustable rod 19 with the transverse rod 20 which connects the lugs 21 secured to the flanges 9 of the upper brake shoe. For adjustment purposes rod 19 is shown as screwthreaded at one end into rod 14 and has the two lock nuts 22 thereon engaging opposite sides of the rod.

The brake is applied by means of the spring 24 one end of which engages the base plate 3 and the other end engages the plate 25 which by means of the screw 26 is adjustably connected with the transverse member 13 of the lever. The spring is overcome and the brake is moved to release position by the electromagnetic means comprising electromagnet 27 having the coil 28 and having the armature 29 which at one end is secured directly to the lever 12, a suitable pole piece 30 in the form of a plate of magnetic material being secured to the core 27 and spaced therefrom by a non-magnetic shim to prevent the armature from clinging to the magnet core.

In order to prevent the brake from dragging on the drum when it is released by the energization of the electromagnet I have provided means for limiting the outward movement of the lower and intermediate shoes from the drum. The post 35 fixed to the base 3 has the adjusting screw 36 at its upper end which is positioned to engage the intermediate brake shoe when the same moves a predetermined distance away from the drum. The lever 37 pivoted on the short post 38 engages the lower shoe at one end and at the other end engages the adjustable stop screw 39 carried by the post 35. By the use of the lever 37 the stop 39 for the lower shoe may be placed out from in under the shoe and at a more accessible point. By suitably adjusting the screws 36 and 39 the releasing movement of the intermediate and lower shoes may be regulated as desired and since the upper shoe is pivoted to the intermediate shoe the former will be raised sufficiently in the releasing movement to clear the drum.

As the friction surface of the shoes wears away in service compensation will be made by adjustment of the rod 19, suitable adjustments also being made when necessary of the screws 36 and 39.

I have chosen the particular embodiment described above as illustrative of my invention and it will be apparent that various other modifications may be made without departing from the spirit and scope of my invention which modifications I aim to cover by the appended claims.

What I claim as new and desire to secure by Letters Patent of the United States, is:

1. The combination with a brake drum of a brake therefor comprising a plurality of rigid brake shoes, means for pivotally connecting together said shoes at their adjacent ends, said means being free to move circumferentially with respect to said drum, a fixed support, a brake operating lever pivoted thereto and having arms pivotally connected respectively with the free ends of the brake, a spring arranged between the lever and the fixed support to move the lever in a direction to apply the brake to the drum and electromagnetic means for moving the lever in the opposite direction.

2. The combination with a brake drum of a brake therefor comprising a series of rigid brake shoes, means for pivotally connecting together said shoes at their adjacent ends, said means being free to move in a radial or a circumferential direction with respect to said drum, a fixed support, means thereon for limiting movement of the brake away from the drum, a brake operating lever pivoted intermediate its ends to said support, means connecting its ends respectively with the free ends of the brake, a spring between the support and the lever for applying the brake, and electromagnetic means for moving the lever to release the brake.

3. The combination with a brake drum of a brake therefor comprising a lower, an upper and an intermediate rigid brake shoe, means for pivotally connecting together said shoes at their adjacent ends, each of said means being free to move in both a radial and a circumferential direction with respect to said drum, a fixed support, means thereon for limiting movement of the lower and the intermediate shoes away from the drum, a brake lever pivoted on said support and having its ends connected respectively to the upper and the lower shoes, a brake applying spring between the support and the lever and electromagnetic means arranged to oppose said spring.

4. The combination with a brake drum of a brake therefor comprising a lower, an upper and an intermediate rigid brake shoe, means for pivotally connecting together said shoes at their adjacent ends, said means being free to move in a radial or a circumferential direction with respect to said drum, a fixed support, adjustable means thereon for limiting movement of the lower shoe away from the drum and for separately limiting movement of the intermediate shoe away from the drum, a bell crank lever mounted on said support, a connection between one end of the lever and said lower shoe, an adjustable connection between the other end of the lever and said upper shoe, a brake operating spring between the support and the lever, means for adjusting the tension of the spring, an armature fixed to said lever and an electric magnet on said support arranged to move the armature to cause the release of the brake.

5. The combination with a brake drum of a brake therefor comprising a lower, an upper and an intermediate rigid brake shoe each having stiffening flanges, means for pivotally connecting said shoes together at their adjacent ends comprising links pinned to said flanges, a fixed support, a bellcrank lever pivoted thereto, means connecting the arms of said lever with the free ends of said brake, a spring arranged to move said lever to apply the brake, an electromagnet arranged to move the lever against the spring to release the brake and adjustable stops arranged to limit the outward movement of the lower and intermediate shoes.

EDGAR PRICE.